A. N. SAMMARONE.
SHAFT SUPPORT.
APPLICATION FILED MAY 18, 1917.
1,257,030.
Patented Feb. 19, 1918.
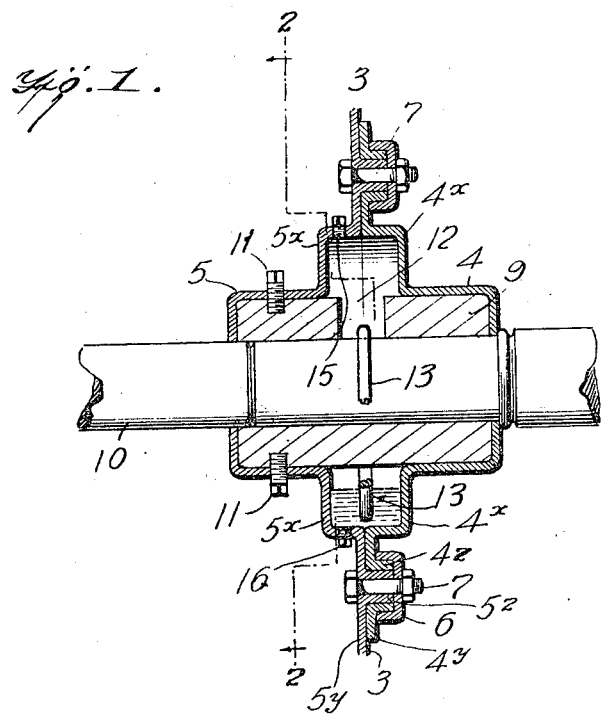
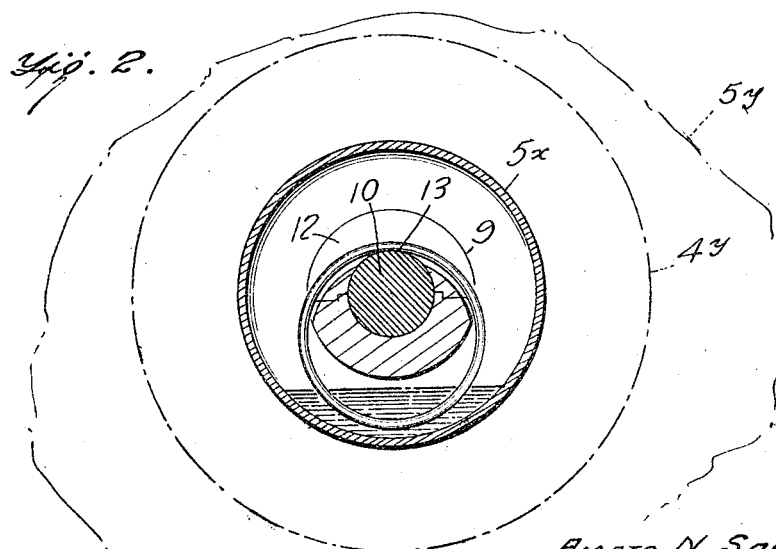
Witnesses
Inventor
AMATO N. SAMMARONE,
By
Attorneys

UNITED STATES PATENT OFFICE.

AMATO N. SAMMARONE, OF AKRON, OHIO.

SHAFT-SUPPORT.

1,257,030.     Specification of Letters Patent.     Patented Feb. 19, 1918.

Original application filed August 16, 1916, Serial No. 115,264. Divided and this application filed May 18, 1917. Serial No. 169,527.

*To all whom it may concern:*

Be it known that I, AMATO N. SAMMARONE, a citizen of the United States, and a resident of Akron, in the county of Summit and State of Ohio, have invented new and useful Improvements in Shaft-Supports, of which the following is a specification.

My invention relates to improvements in shaft bearings or hangers, and it consists in the combinations, constructions and arrangements herein described and claimed.

The present application is a division of a prior application, Serial No. 115,264, filed August 16, 1916. In said prior application the present construction was set forth in connection with an electric dynamo or motor.

An object of the present invention is to provide a shaft bearing or support which is made of pressed sheet metal and which is provided with an oil well, the device having novel means for preventing the leaking of the oil from the oil well.

A further object of my invention is to provide a support which may be applicable to any revolving shaft, said support consisting of two parts made of pressed metal and holding anti-friction linings or working surfaces.

A further object of my invention is to provide a support which may be readily taken apart or assembled as desired.

Other objects and advantages will appear in the following specification, and the novel features of the invention will be particularly pointed out in the appended claims.

My invention is illustrated in the accompanying drawings forming part of this application, in which—

Figure 1 is a sectional view of my preferred form of bearings; and

Fig. 2 is a section along the line 2—2 of Fig. 1.

In the drawings a portion of the shaft support or bearing is shown at 3. The support itself has portions 4 and 5 which are made of pressed sheet metal, these portions facing one another, as shown in the drawing. Each portion is provided with an extension such as that shown at $4^x$ and $5^x$, these extensions registering and serving as an annular chamber, the bottom of which constitutes an oil well.

As will be seen from the drawings, the member 4 has a flange $4^y$ which is provided with an opening surrounded by a flange $4^z$. A cap 6 is provided and this cap fits over the flange $4^z$ and is held by means of a bolt 7 or other suitable connecting member which passes through an extension $5^y$ of the member 5 and also through a sleeve $5^z$ which enters the annular flange $4^z$. This construction affords an oil-tight joint.

Disposed within the housing formed by the members 4 and 5 are the bearing members 9 for the shaft 10. These may be made of any suitable material, the specific composition of which forms no part of the present invention. These members, as will be seen from Fig. 1, are preferably held in position by means of set screws 11, a space 12 being provided above the shaft into which a ring 13 may play, the bottom part of this ring 13 dipping into the oil in the oil well formed by the opposed portions $4^x$ and $5^x$.

The construction described has the following advantages: In the first place it is relatively light, being made of pressed metal. It is easily taken apart, since the bolts 7 may be withdrawn at any time and the bearing members 9 may be removed or replaced. The construction by means of which the parts are joined together is such that there is no danger of the oil dripping from the oil well. The ring 13 keeps the oil supplied to the bearings 9.

While I have shown the device as used in connection with a shaft 10 of a motor or dynamo it is obvious that it might be used as a support or hanger for any kind of shafting, such as the main line shafting in manufacturing establishments or for any shafting whatever.

In order to fill the oil well conveniently I arrange a filling plug 15 in one of the housing sections, as, for instance, the section 5, and also provide a drain plug 16 which may be removed to drain oil from the oil well.

I am aware that various modifications might be made but I consider as my own all such modifications as fairly fall within the spirit and the scope of the invention.

I claim:

1. A shaft support comprising a pair of housing members made of pressed sheet metal, said housing members being oppositely disposed and the edges of said members being in contact, one of said housing members having a sleeve, the other of said housing members having a sleeve arranged to receive the first named sleeve, a cap arranged to cover the end of the second named sleeve, and a bolt extending through said first named sleeve and through said cap for securing the parts together.

2. A shaft support comprising a pair of housing members made of stamped sheet metal, said members having contacting edges, one of said housing members having openings, sleeves carried by the other housing member and arranged to enter the openings of the first named housing member, and bolts arranged to pass through the sleeve for securing the parts together.

AMATO N. SAMMARONE.

Copies of this patent may be obtained for five cents each, by addressing the "Commissioner of Patents, Washington, D. C."